Patented Aug. 10, 1954

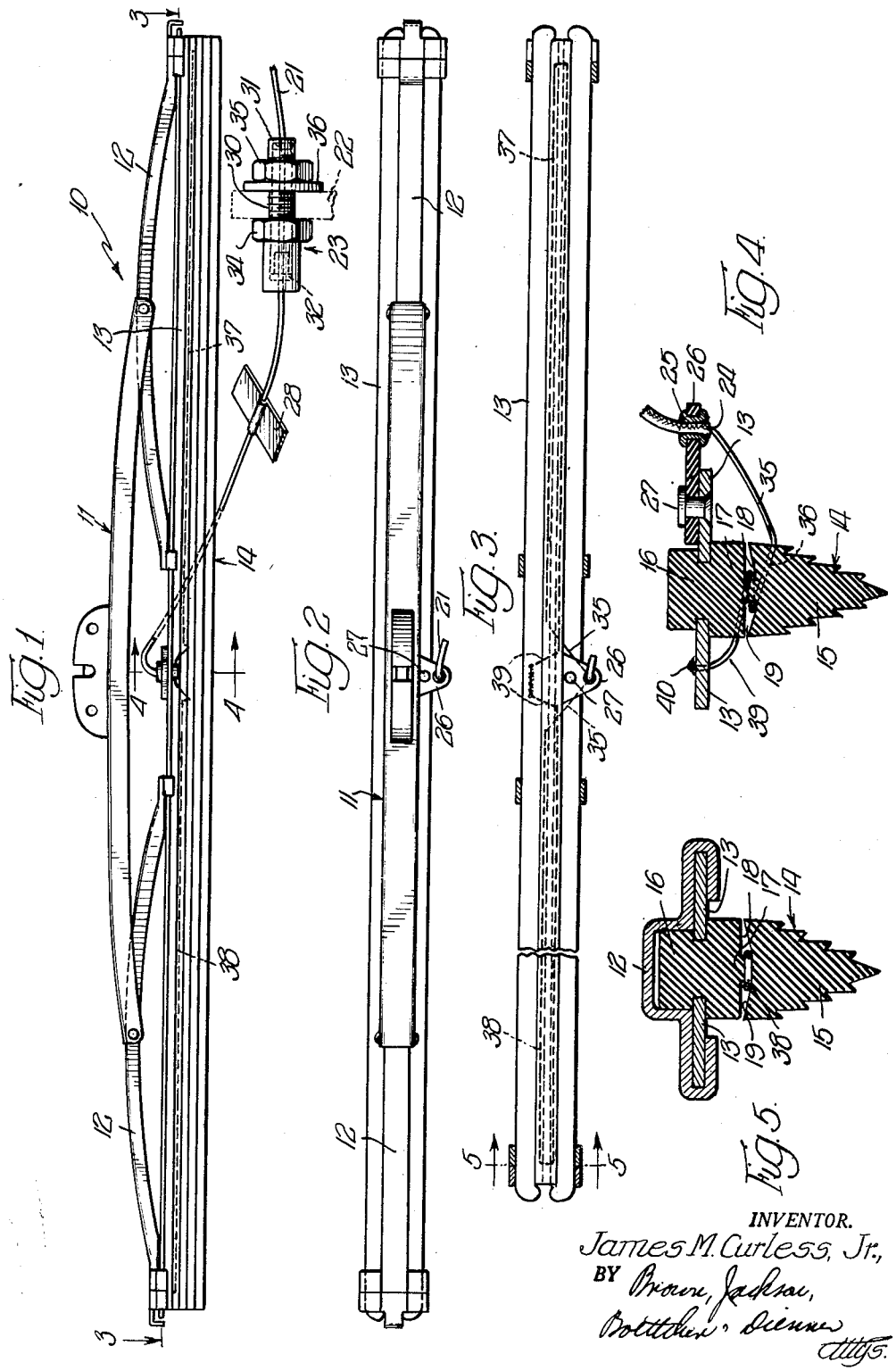
Aug. 10, 1954 — J. M. CURLESS, JR — 2,686,247
DEFROSTER FOR WINDSHIELD WIPERS
Filed Dec. 29, 1952
INVENTOR.
James M. Curless, Jr.

2,686,247

UNITED STATES PATENT OFFICE 2,686,247

DEFROSTER FOR WINDSHIELD WIPERS

James M. Curless, Jr., Lowell, Ind.

Application December 29, 1952, Serial No. 328,418

1 Claim. (Cl. 219—19)

My present invention relates generally to windshield wipers of the class normally employed on automotive vehicles.

More particularly my present invention relates to a new and improved defroster means for utilization with a conventional flexible windshield wiper blade whereby the material of the wiper blade may be maintained in a flexible condition, unclogged and unrigidified by frozen snow and water during inclement weather.

The difficulty of maintaining automotive vehicle windshields free of frozen snow, sleet, rain etc., which is particularly prevalent and vexatious during the inclement weather of winter months, has been successfully met by various defroster systems presently familiar in the conventional automobile. However, the conventional defroster system, as now employed, lacks the provision of maintaining the wiper blade of the windshield wiper in an unfrozen flexible condition wherein its best wiping qualities are insured. As a result, the motorist is all too frequently confronted with a frozen windshield wiper blade clogged with snow and sleet and therefore inefficient in its wiping function even though an automobile defrosting system has maintained his windshield free of frozen snow, etc.

Briefly, my present invention recognizes the difficulty of maintaining a rubber windshield wiper blade free of clogging frozen snow, sleet, rain, etc., and seeks to present a satisfactory solution to this problem. To this end I employ a heater wire element, fed from the normal electrical supply source of the automobile or like vehicle, which, through intimate contact with the rubber of the wiper blade, provides a sufficient source of heat to maintain the rubber in a flexible condition free of frozen snow, sleet, rain, etc. in even the most inclement winter driving conditions.

The main object of my present invention is to provide a new and improved defroster means for windshield wiper blades whereby the same may be maintained in a flexible and unfrozen condition to insure maximum operating efficiency thereof during frigid inclement weather.

Another object of my invention is to provide a new and improved heater means for use with a normal flexible windshield wiper blade whereby the same may be maintained in a heated condition to prevent the formation of encrusting frozen water, snow, sleet etc., thereon, thereby to promote driving safety.

The above and further objects and features of my present invention will become apparent to those familiar with the art from the following detailed description and specification therefor and with reference from time to time to the accompanying drawings of a preferred embodiment thereof.

In the drawings:

Figure 1 is a side elevational view of a conventional flexible windshield wiper assembly embodying the new and improved defroster means of my present invention;

Figure 2 is a top plan view of the windshield wiper blade assembly illustrated in Figure 1;

Figure 3 is a cross sectional view taken through the rubber wiper blade of Figure 1 at substantially line 3—3 of Figure 1;

Figure 4 is a cross sectional view taken substantially along line 4—4 of Figure 1; and Figure 5 is a detailed cross sectional view taken substantially along line 5—5 of Figure 3.

Turning now to the features of my invention as illustrated in the drawings, it will be understood from an inspection of Figures 1 and 2 that a conventional flexible windshield wiper blade assembly 10, illustrated therein, comprises a mounting arm assembly 11 at the ends of which are pivotally supported suspension arms 12, 12. Arms 12, 12 are interconnected with an elongated pair of flexible blade supporting members 13 adapted to hold a conventional flexible rubber wiper blade 14.

It will be recognized that the wiper blade assembly illustrated is a conventional variety and does not necessarily comprise the only style of wiper blade assembly to which the features of my present invention are adaptable. Other forms of wiper blade assemblies may be utilized with equal facility, but for purposes of the present illustration and description I prefer the style of blade assembly illustrated as it is usable with both planar and curved windshields.

It will be noted in particular from Figures 4 and 5 of the drawings, that the rubber blade 14 is provided with a lower wiper portion 15 and an upper mounting portion 16; which portions are interconnected by a narrowed neck portion 17 and separated, except for their interconnection by neck 17 to form a pair of separated air spaces 18 and 19. The provision of such air spaces in the formation of the blade constitutes an important feature in the utilization of my new and improved heater therewith, since such afford a convenient space inwardly of the exterior surfaces of the wiper blade in which the heating elements of my invention may reside as will appear presently hereinafter.

Turning now to the features of my improved heater assembly, as illustrated in Figures 1, 3, 4 and 5 of the drawings, it will be seen that I provide an electrical supply conduit 21 connected to a source of electrical potential, such as the battery of the vehicle, and led through a panel 22 of the vehicle cowl or hood, preferably adjacent the windshield wiper arm mounting post, by means of a mounting assembly, indicated generally at 23.

One end of supply conductor 21 is connected by soldering or the like, as at 24, to a hollow brass conductor rivet 25 attached to a substantially triangular shaped insulated mounting member 26 rigidly secured to one of the blade supporting plates 13 by means of a rivet 27 or the like. It will be appreciated from a study of Figures 2 and 3 in particular that the mounting plate 26 is so positioned on the blade assembly that its triangular base substantially abuts the upper portion 16 of the wiper blade so that the same is stabilized in its mounted condition. As shown in Figure 1, clip members 28 are fastened on the supply conductor 21, intermediate the mounting assembly 23 and its connection with the wiper assembly, to provide means of attaching the conductor 21 inconspicuously to a windshield wiper arm (not shown).

The mounting assembly 23, as herein illustrated, comprises a hollow threaded tubular member 30 within one end of which is positioned an internally disposed insulating bushing 31 through which the supply conductor is led. At the opposite end of the tubular member 30 a second insulating bushing 32 is inserted and an internally threaded cap member 33 is applied thereabout for maintaining the bushing 33 and member 30 in assembled condition. Nut means 34 and 35 are utilized in conjunction with a compressible washer 36 to securely fasten the mounting assembly to the cowl portion or panel 22 of the vehicle.

From an inspection of Figures 3 and 4, in particular, it will be recalled that the supply conductor is attached to the hollow rivet member 25 disposed on the insulating mounting member 26. A small heater wire 35 is then soldered or otherwise rigidly secured to the end of the supply conductor at the hollow rivet member 25 and led through the wiper blade portion 15 of the blade 14 below the air space 18 thereof. The heater element is then directed upwardly as at 36 to invade the air space 19, as shown in particular in Figure 4 of the drawings. From Figure 3 of the drawings it will be seen that the heater element 35 is formed into two identical interconnected lop portions 37 and 38, disposed according to the layout of Figure 3. Each of the loop portions 37 and 38 is formed by threading the heater wire from rivet 25 through the blade portion 15, at substantially the middle of the blade asembly to air space 19, laying the wire along chamber 19 and around the end of neck portion 17 at one end of the blade. Heater 35 then is disposed back along chamber 18 to substantially its starting point at the middle of the blade. As seen in Figure 3, it will be appreciated that each loop of the heater element has portions 39 passing from chamber 18 through the neck portion 17 of the blade and thence upwardly to one blade supporting plate 13 to make a grounded connection therewith as at 40 (see Figure 4).

Grounding of the blade supporting back plates 13, 13 with the chassis of the vehicle takes place through the pivotally suspended arm portions 12, connected to the back plates 13 and from there via the mounting arm 11 to a conventional windshield wiper arm which reciprocates arcuately when driven by a windshield wiper motor according to familiar practice.

If desired, selective energization of the heater element 35 may be carried out by providing a conventional switch control (not illustrated) preferably located on the dash of the vehicle in convenient operating position for the driver. In utilizing the features of my invention the heater element is preferably made of non-corrosive Nichrome steel wire and selected of a diameter and resistance suitable for drawing a voltage sufficient to permit the rapid heating of the windshield wiper blade and the metal portions of the blade assembly.

In particular I contemplate that the diameter of the Nichrome heater elements shall be designed to permit 6, 12, 24 and 32 etc. voltages. According to present day usage, the 6 volt heater wire would have application for a conventional passenger automobile, the 12 volt for trucks and like carriers, 24 volt for use in airplanes, and 32 for use in railroads, such as the modern day diesel locomotives. These designated voltages are by no means to be construed as exhaustive or restrictive of the design adaptability of the heater system herein described, but are set forth for purposes of illustrating the utility of my invention. In practice I have found that the normal windshield wiper assembly, as familiarly utilized by a passenger automobile, can be raised from a —5° F. to the melting point of water in approximately 2 to 3 minutes with my heater, thus insuring an efficient and effective means for freeing the flexible rubber blade and its associated metal blade assembly parts from troublesome frost and ice.

This feature of freeing the blade assembly of ice and snow, etc. is especially important in the situation where curved windshields are employed in the vehicle since a flexible blade construction, such as I have herein illustrated, must, to maintain operating efficiency, follow the curvature of the windshield in use. Although present day defroster systems which are employed to heat the windshield itself effect a satisfactory melting of snow and ice on the glass of the windshield, the same nevertheless do not deliver sufficient heat to prevent the encrusting and caking of the windshield wiper assembly with detrimental ice. Further, in the operation of the flexible windshield wiper blade on a curved windshield, a constant flexing action of the wiper blade in conformity to the curvature of the windshield itself takes place. Since the windshield is not formed at a constant or the same curvature it is essential that this flexing action of the blade be maintained for its efficient operation. Therefore, when a flexible windshield wiper blade, as used with a curved windshield, is frozen or rigidified through the encrusting action of sleet, snow, ice etc., inefficient wiping function results. Consequently, my new and improved heater is particularly useful with the flexible windshield wiper blade assemblies and for curved windshields, since, through its heating action, the undesired freezing or rigidification of the blade assembly may successfully be avoided.

Thus it will be understood and appreciated that I have herein disclosed the features of a new and improved defroster or heater means for use with windshield wipers and like articles. Further, while I have herein described and illustrated my invention as related to a specific embodiment thereof, it will be appreciated that numerous changes, modifications and substitutions of equivalents may be made therein without departing from the spirit and scope of my invention. For this reason I do not wish to be restricted to the specific form of my invention herein illustrated and described except as may appear in the following appended claim.

I claim:

An electrical defroster means for use especially with windshield wipers for curved windshields and the like, comprising, a flexible rubber wiper blade, a flexible metal support plate extending lengthwise along the back of said blade, said blade being formed with a pair of lengthwise extending chambers opening inwardly of opposite sides thereof, an insulating member mounted substantially at the mid-point of said plate, an electrical supply conductor having connection with a source of electrical potential, means for connecting said conductor to said insulating member, and a heater element having a pair of reentrant loops, each one of which extends through substantially the mid point of said blade and extends along opposite sides of said blade in said chambers and around one end of the blade, said two loops each having one end grounded to said metal plate and the other end connected to said conductor at the insulating member, such that the heater element serves to heat said metal plate and said rubber blade when energized to defrost the same.

References Cited in the file of this patent

UNITED STATES PATENTS

| Number | Name | Date |
|---|---|---|
| 1,622,416 | Burton | Mar. 29, 1927 |
| 1,640,887 | Davis | Aug. 30, 1927 |
| 1,980,254 | Cartwright | Nov. 13, 1934 |
| 2,153,544 | Bell | Apr. 11, 1939 |
| 2,302,780 | Le Clair | Nov. 24, 1942 |